April 22, 1969  W. B. LOWMAN ET AL  3,440,421
STATISTICAL SAMPLING OF A MOVING PRODUCT USING A GAUGING DEVICE
WITH A VARIABLE SENSING AREA FUNCTIONALLY RELATED
TO A VARIABLE PRODUCT SPEED
Original Filed April 27, 1961

INVENTORS
Walker B. Lowman
Richard D. Felty

By Anthony D. Cennamo
ATTORNEY

United States Patent Office 3,440,421
Patented Apr. 22, 1969

3,440,421
STATISTICAL SAMPLING OF A MOVING PRODUCT USING A GAUGING DEVICE WITH A VARIABLE SENSING AREA FUNCTIONALLY RELATED TO A VARIABLE PRODUCT SPEED
Walker B. Lowman, Columbus, Ohio, and Richard D. Felty, Fort Lauderdale, Fla., assignors to Industrial Nucleonics Corporation, a corporation of Ohio
Continuation of application Ser. No. 106,037, Apr. 27, 1961. This application Feb. 15, 1965, Ser. No. 436,713
Int. Cl. G01t 1/18; H01j 39/28, 39/30
U.S. Cl. 250—83.6         16 Claims

ABSTRACT OF THE DISCLOSURE

Disclosed herein is a device for statistical quality control analysis of an elongated product such as a cigarette rod. The product is transported past a beta or gamma radiation gauge having an adjustable-length gauging aperture, and coacting controls are provided for the aperture length and the product transport speed so that the ratio of the speed to the aperture length is constant for a given frequency bandwidth of the gauge. A radiation absorbing wedge may be coupled to the aperture length control so that, for a constant product, the radiation received by the detector also remains constant as the aperture length is varied.

---

This application is a continuation of co-pending application Ser. No. 106,037, filed Apr. 27, 1961, in the names of Walker B. Lowman and Richard D. Felty, now abandoned.

This invention relates to the method and means for measuring, analyzing and indicating the variation in a physical characteristic, such as weight, density or profile, of a product between segments of the product of selected size or between a segment of the product and a standard.

In production line processes where the length or number of products produced is great, measuring devices which integrate variations occurring in a physical characteristic of the product over a substantial length are frequently used to control the processes. While these known measuring devices and techniques are adequate for a control function they are, because the time lags in the process itself prevent control of short term variations, usually inadequate for quality control purposes. These prior art systems are especially inadequate where information is desired such as the weight of a selectable length or the variations in weight between lengths of the product. These weight qualities may be determined by measuring the variation in weight between adjoining segments of the product or the variation in weight of a selected length and comparing it with a standard product weight. As a result of the limitations of prior devices for measuring continuous products the measurement of short term variations in a physical property, such as weight, is usually done manually. This is generally accomplished by a quality control inspector who, after randomly selecting sample products from the production lines, will by feel, observation, and physical measurements obtain information as to the variation in some of the characteristics of the sampled products.

In certain production lines where long continuous lengths of a product are produced, such as in cigarette making machines, it may be necessary for the product quality control inspector to first sever a portion of the product from the moving production line and to then cut this severed portion into specific lengths before any physical measurements can be made which will provide data on the variations in the characteristics being tested. This manual method of quality control is often found to be unsatisfactory as it is laborious, expensive, time consuming and, as only a limited number of samples can be taken, only a limited amount of information is obtained. In some industries this method of quality control and inspection is impractical and sometimes even impossible.

These and several other disadvantages are overcome by the present invention wherein a product is moved by a variable speed transporting means and there is provided a measuring device with an adjustable sensing area interconnected to control in selectable fixed ratios, the speed of the transporting means. The output of the measuring device is then fed to indicating, recording or analyzing readout instruments. This type of measuring equipment may be termed a product profilometer as it allows a worker unskilled in quality analysis and control to determine the quality profile of the product being produced by merely selecting the length of the product over which the quality information is desired and observing the readout indicators. Additional output devices may be incorporated which will detect breaks, voids, missing material or, generally, the undesirable lack of excess of material and indicate this to the operator by the use of markers, identifiers, classifiers or rejectors in a well known manner.

Accordingly, it is an object of this invention to provide a new and improved measuring system for use in quality control inspection of a continuously produced product.

It is another object of this invention to provide a measuring system which indicates variations in a physical characteristic of a continuously produced product over selectable segments of that product.

A further object of the present invention is to provide a system which measures a physical characteristic of selectable segments of a product and to indicate the variations in this characteristic between adjoining segments of the product as well as the variation of each segment as compared to a standard value.

A still further object of this invention is to provide an apparatus for quality control inspection of a product on a driven conveyor line that is simple and inexpensive to construct, easy to operate, and is readily adaptable for use with present manufacturing processes.

It is another object of this invention to provide a measuring system which provides information on quality of a product examined by the measuring system which requires only a single manual operation to select the length or portion of material being inspected.

A further object of this invention is to permit automatic handling of product samples and thus allow greater amounts of the product to be sampled and analyzed than is possible with most manual systems.

These and further objects and advantages of this invention will become more apparent upon reference to the following specification and appended drawings wherein.

Figure 1:
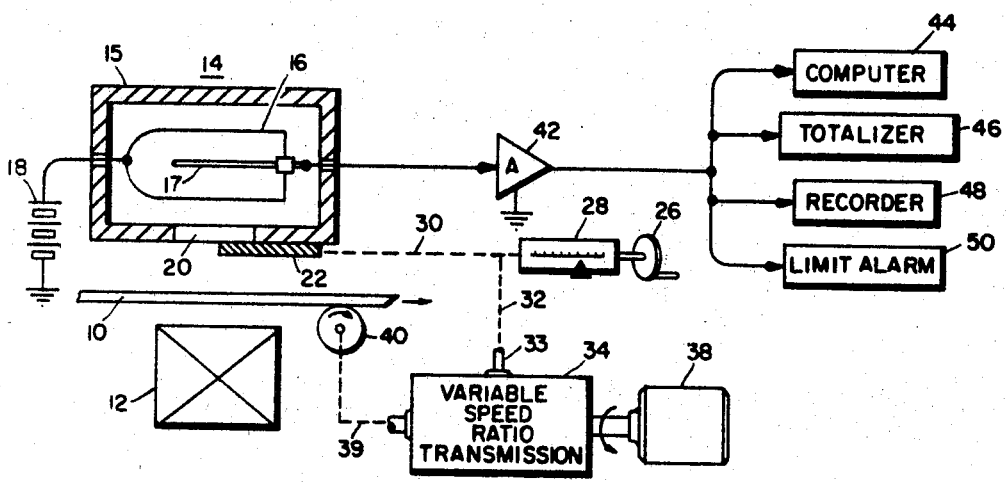
FIG. 1 is a simplified schematic in block showing the electrical and mechanical features of a typical measuring device in accordance with the present invention.
Figure 2:
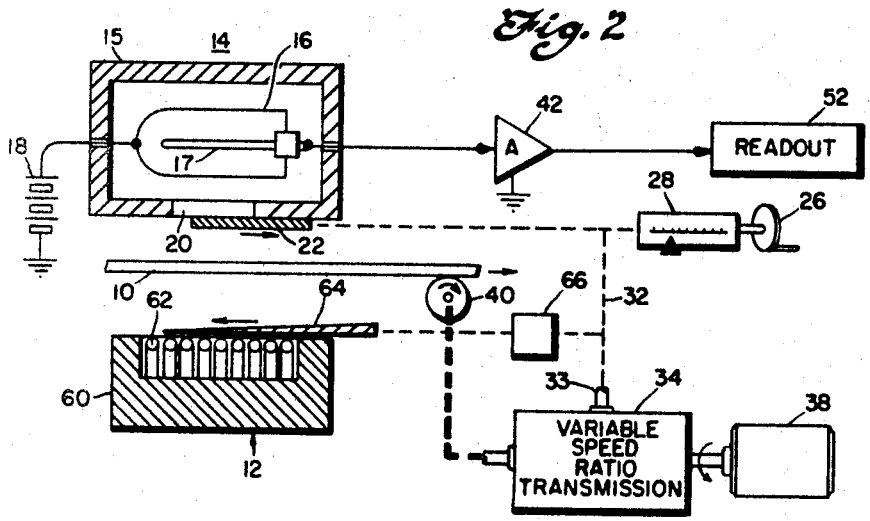
FIG. 2 is a simplified schematic in block showing the measuring device of FIG. 1 wherein a specific radiation source is illustrated.

Referring now to FIG. 1 there is illustrated a specific embodiment of a measuring device which incorporates the principles of the invention. Numeral 10 of this figure refers to the product or material whose characteristic, such as weight per segment or unit of length, or density per segment or unit of length, is to be measured. The measuring device consisting of, for example, a radiation source 12 and a detector 14 placed in the usual manner so that the detector 14 will receive the radiation from source 12 after the radiation has been modified by interaction with the product 10. The source 12 may be of the radioactive type which emits beta and/or gamma rays of a suitable energy spectrum. The radiation detector may be of any suitable type such as a Geiger-Mueller tube, an ionization chamber, or a scintillation detector. For purposes of illustration an ionization chamber is shown as the detector 14 in FIG. 1 having an outer casing 15 made of any suitable shielding material and a window opening or aperture 20 therein of fixed width but of selectable length.

A high voltage is impressed across electrodes 16 and 17 of ionization chamber 14 by a battery 18 or other suitable voltage source. Signals obtained from the chamber 14 are first amplified by amplifier 42 and are then applied to either one or more readout instruments, such as a sigma or variance computer 44, a product band totalizer 46, recorder 48 or a limit alarm 50. The limit alarm 50 may be a detector circuit which actuates an alarm, marker or substandard rejection circuit in the event the measuring device's output indicates the presence of a substandard product. The elements 42, 44, 46, 48, and 50 may comprise the system described in Ser. No. 707,191, now Patent No. 3,091,756 for Process Evaluation System, filed by Walker B. Lowman, now Patent No. 3,091,756 and Ser. No. 806,675, now Patent No. 3,147,370 for Measuring and Controlling System, filed by Walker B. Lowman, now Patent No. 3,147,370. A production analyzer which may be utilized as a readout device in the subject invention is disclosed in U.S. Patent No. 2,964,707, issued on Dec. 13, 1960, to R. W. Dewey and A. Norwich. The variance computer disclosed in U.S. Patent No. 2,965,300, issued on Dec. 20, 1960, to S. A. Radley and P. Spergel is suitable for use as a readout device in the present invention to compute statistical variance of a selected segment of a passing material from a standard value.

Referring again to the detector 14 specifically a handwheel 26 connected to movable element 22 through a linkage 30 controls the length of the opening of window 20. This controlled window opening is shown in FIG. 1 as being relative to the detector 14. It is to be understood that the controlled window would be equally effective if it were to control the source opening. Again a pair of controlled openings may be employed and be within the scope of the invention. Element 22 may be constructed of the same type of shielding material as used in casing 15 or other suitable material. A calibration scale 28 associated with handwheel 26 is scaled to the length of the opening of the window 20 so that as handwheel 26 is turned the operator can by observing the scale determine without further measurements the exact length of the window opening 20. Alternatively the scale can be calibrated in product length. The position of handwheel 26 also determines (through the mechanical connection of linkage 32 to a variable speed ratio transmission 34) the speed the product 10 moves past window 20.

The transmission 34 is of the type that gives a definite change of the ratio of the output shaft speed to the speed of its input shaft dependent upon the angular position of a control shaft 33 connected to the handwheel 26 by linkage 32. A transporting means drive wheel 40 receives power from a motor 38 through connection 39 and the variable speed ratio transmission 34. The variable speed ratio transmission 34 is designed to change the speed of the product 10 as the handwheel 26 is turned according to a preselected ratio, explained hereinafter. This permits a single adjustment of handwheel 26 to select the length of the window opening and to also select the correct speed of the product so that the output of the ionization chamber will be related to the unit length selected by handwheel 26.

An example of the use of the radiation measuring device described above is to determine the weight of adjoining selectable segments of a passing product. If the length of the detector disposed parallel to the movement of the product is constant and the rate of movement of the product is also constant the variations in the output of the detector are related to variations in the weight of the product between determinable lengths. For good correlation of a continuous variation measurement with the length of the sample it is desired to analyze, the longitudinal dimension of the window 20 should be set equal to the longitudinal dimension of the sample segment. In operation the handwheel 26 is set so that the length of the window opening 20 is equal to the selected sample length, for example, 10 mm. The adjustment of the handwheel 26 also adjusts the speed of the product through the mechanical interconnection of the handwheel to the control shaft 33 of the transmission 34. The speed of the product, to correlate the output of the detector-amplifier combination with the selected sample length, is determined by the formula, $$V = fL$$

where V is the maximum process velocity that should be used, L is the minimum detachable wavelength, approximately twice the minimum sample length, and $f$ is the frequency bandwidth of the ionization chamber 14 and amplifier 42.

A known ionization chamber-amplifier combination such as that disclosed in U.S. Ser. No. 34,748 now Patent No. 3,080,336 filed by Walter B. Lowman which may be adapted for use in the above described system has a frequency bandwidth of 16 c.p.s. If the unit length of the sample selected is 10 mm. the maximum velocity or speed of the product for good correlation of the measurement with the 10 mm. length of the sample selected is equal to 16 c.p.s. × 20 mm. or 320 mm./sec. or 60 ft./min. This maximum product spd may be increased without sacrificing efficiency, either by selecting a longer sample segment or by increasing the bandwidth of the amplifier-ionization chamber combination. As the aperture length adjustment control and the product velocity control are interlocked through the transmission 34 in the ratio set forth in the above formula, the only adjustment needed for each desired analysis is to set the handwheel 26 to the selected sample length. A change in frequency bandwidth of the ionization chamber-amplifier will of course necessitate the changing of the ratio set forth.

One application of the present invention is to determine the weight quality of a cigarette that has been produced. A cigarette making machine usually produces a long continuous cigarette rod which is subsequently cut into the desired individual cigarette lengths. In the application of the present invention to cigarette making machines a conveyor having selectable speeds is used to move the continuous cigarette rod between the source 12 and the adjustable window 20 of the detector 14. By rotation of handwheel 26 the length of the window 20 is set equal to the length of cigarette rod for which variance data is sought. The movement of the handwheel also sets the conveyor line speed in accordance with the formula $V = fL$ so that the output of the detector-amplifier is correlated to the selected length. The readout indicators would then inform the operator of the variations in weight between the selected sample length as the cigarette rod passes the window of the detector.

If the product to be measured is made up of sequential pieces and a conveyor is used to move these sequential pieces past the measuring instrument, these pieces should be joined but to head without any gap between them. This goal can be accomplished by having an entrance conveyor moving at a slightly higher speed than an exit conveyor, whereby the reduction in speed at the exit causes the product to be butted together as it moves past the measuring head.

In order to keep the total amount of radiation transmitted through the product at an optimum value for the particular product length selected, a wedge 64 interlinked with handwheel 26 through reversing coupling 66 may be added over the source 12. As the length of the opening of window 20 is increased the thickness of wedge 64 interposed between the source and the product is also increased. Conversely, when the aperture length is diminished the wedge is withdrawn to the point where only a very thin portion is interposed between the source and product. The effect of this wedge is to hold the radiation entering the ionization chamber to an optimum value when the aperture of the detector is lengthened and a greater length of source is exposed. The wedge material and shape should be selected so that the ratio of the intensity of the radiation field to the length of the aperture opening 20 is optimum and bremsstrahlung generation at a minimum, unless, of course, the bremsstrahlung radiation is desired for the particular characteristics of the product being measured.

The window 20 of the detector may be constructed so that both its length and width are adjustable, or alternatively an iris type of construction could be used to vary the shape of the window. This would provide a more versatile detector as rectangular, square or round areas of the product could be sampled. In any event, the that both its length and width are adjustable, or alternactive area of the source should be larger than the largest opening of the particular window being used.

While the specific embodiments describe the present invention in conjunction with nuclear radiation sources and nuclear radiation detectors, it is obvious to those skilled in the art that other types of sources and detectors may be used in practicing this invention. In addition, it should also be obvious to those skilled in the art that numerous other changes, omissions and additions in the devices described may be made without departing from the scope of this invention.

What is claimed is:

1. An automatic statistical sampling device for determining the variations in a physical property between equal length segments of a product, comprising measuring means, means for transporting said product in a selected direction past said measuring means, means in said measuring means for defining an area of said product measured instantaneously by said measuring means, means for adjusting the length of said area in said direction of movement of said product, means for controlling the speed of said product transporting means and means interconnecting said area length adjusting means and said speed controlling means for maintaining a fixed ratio between the length of said area and the speed of said product transporting means.

2. An automatic statistical sampling device for determining the variations in a physical property between equal length segments of a product, comprising measuring means, means for transporting said product in a selected direction past said measuring means, means in said measuring means for defining an area of said product measured instantaneously by said measuring means, means for adjusting the length of said area in said direction of movement of said product, means for controlling the speed of said product transporting means, means interconnecting said area length adjusting means and said speed controlling means for maintaining a fixed ratio between the length of said area and the speed of said product transporting means, and a statistical evaluation device connected to the output of said measuring means for analyzing said product with respect to said variations in said physical property.

3. An automatic statistical sampling device for determining the variations in a physical property between adjoining equal length segments of a product of selectable length comprising means for measuring the physical property of the product, said measuring means having a variable sensing area, variable speed drive means for transporting the product past the variable sensing area of said measuring means, means for adjusting said variable sensing area equal in dimension to the selected portion of the product, means coacting with said area adjusting means for adjusting the speed of the product drive means in a selectable ratio to the adjustment of the sensing area of the measuring means to relate the output of the measuring means to the measured physical property of the selected portion of the product, and readout means connected to the output of said measuring means for analyzing and indicating the variations of the measured property between adjoining selected portions of the product as the product moves past the variable sensing area of the measuring means.

4. An automatic statistical sampling device for determining the variations in a physical property between adjoining equal length segments of a product of selectable length comprising means for measuring the physical property of the product, said measuring means having a variable sensing area, variable speed drive means for transporting the product past the variable sensing area of said measuring means, means for adjusting said variable sensing area equal in dimension to the selected portion of the product, means for varying the speed of the variable speed drive means in accordance with the relationship $V=fL$, where V is the speed of the variable speed drive means, $f$ is the frequency bandwidth of the measuring means and L is approximately equal to twice the unit length of the selected product segment, and readout means connected to the output of said measuring means for analyzing and indicating the variations of the measured property between adjoining selected portions of the product as the product moves past the variable sensing area of the measuring means.

5. A statistical sampling device for measuring variations in a product, comprising means for transporting said product in a selected direction past said device, means in said device for irradiating said passing product, a radiation detector for receiving a beam of radiation from said product, means for adjusting the length of said radiation beam in said selected direction, and means controlling said transporting means and coacting with said beam length adjusting means for maintaining a fixed ratio between the speed of said product transporting means and said length of said radiation beam.

6. An apparatus for statistically analyzing a product for variations between segments thereof having equal and slectable length, comprising means for transporting said product in a selected direction past said apparatus, means in said apparatus for irradiating said passing product, means including a radiation detector receiving a beam of radiation from said product which is modified in accordance with said variations for producing a signal in accordance with said variations, a statistical evaluation device receiving said signal for indicating the degree of non-uniformity in said segments, means for adjusting the length of said radiation beam in said selected direction, and means coacting with said length adjusting means for fixing the speed of said transporting means in proportion to the adjusted length of said beam, whereby said indicated degree of non-uniformity is related to a constant length of said segments.

7. An apparatus for statistically analyzing a product for variations between segments thereof having equal and selectable length, comprising means for transporting said product in a selected direction past said apparatus, means in said apparatus for irradiating said passing product, means including a radiation detector receiving a beam of radiation from said product which is modified in accordance with said variations for producing a signal in accordance with said variations, means for adjusting the length of said radiation beam in said selected direction, means for adjusting the magnitude of said signal in inverse relation to said adjusted length of said beam, a statistical evaluation device receiving said adjusted signal for indicating the degree of non-uniformity in said segments, and means coacting with said radiation beam length adjusting means for fixing the speed of said transporting means in proportion to the adjusted length of said beam, whereby said indicated degree of non-uniformity is related to a constant length of said segments.

8. An automatic statistical sampling device for determining the variations in a physical property between adjoining equal length segments of a product of selectable length comprising: means for measuring the physical property of the product, said measuring means including a radioactive source of penetrative radiation and a radiation detector having a window of fixed width and of adjustable length through which radiation may enter, means for transporting the product past said window, means for adjusting the length of said window, a movable absorptive wedge interposed between said radioactive source and said radiation detector, reverse gear means driven by said window length adjusting means and connected to move said wedge to increase the thickness of the wedge interposed between the source and the detector as the length of the window opening is increased and to decrease said thickness as the window length is decreased, and readout means connected to the output of said measuring means for analyzing and indicating the variations of the measured property between adjoining selected portions of the product as the product moves past the variable sensing area of the measuring means.

9. An automatic statistical sampling device for determining the variations in a physical property between adjoining equal length segments of a product of selectable length comprising: means for measuring the physical property of the product, said measuring means including a radioactive source of penetrative radiation and a radiation detector having a variable sensing areas, means for transporting the product past the variable sensing area of said measuring means, means for adjusting said variable sensing area equal in dimension to the selected portion of the product, a variable speed drive means, means coacting with said sensing area adjusting means for adjusting the speed of the product drive means in a selectable ratio to the adjustment of the sensing area of the measuring means to relate the output of the measuring means to the measured physical property of the selected portion of the product, and readout means connected to the output of said measuring means for analyzing and indicating the variations of the measured property between adjoining selected portion of the product as the product moves past the variable sensing area of the measuring means.

10. An automatic statistical sampling device for determining the variations in a physical property between adjoining equal length segments of a product of selectable length comprising: means for measuring the physical property of the product, said measuring means including a radioactive source of penetrative radiation and a radiation detector having a variable sensing area, means for transporting the product past the variable sensing area of said measuring means, means for adjusting said variable sensing area equal in dimension to the selected portion of the product, means for varying the speed of the variable speed drive means in accordance with the relationship $V=fL$, where V is the speed of the variable speed drive means, $f$ is the frequency bandwidth of the measuring means and L is approximately equal to twice the unit length of the selected product segment, and readout means connected to the output of said measuring means for analyzing and indicating the variations of the measured property between adjoining selected portions of the product as the product moves past the variable sensing area of the measuring means.

11. Apparatus for determining the variations in a physical property of a product, comprising: means for measuring the physical property of the product, said measuring means including a source of penetrative radiation and a radiation detector having a window defining an area through which radiation may enter, means for changing the area of said window, and means coacting with said window area changing means for automatically maintaining the radiation intensity reaching said detector substantially constant as said window area is changed.

12. A method of adjusting a statistical sampling device for determining variations in a physical property of a product initially moving at a desired speed and having a measuring means with an initial desired detector bandwidth and initially measuring a desired area of said product instantaneously, the steps comprising: changing one of said product speed, detector bandwidth, or measuring area, and adjusting another of said product speed, detector bandwidth, or measuring area to maintain the initial ratio between said one and said another of said product speed, detector bandwidth or measuring area.

13. A method of adjusting a statistical sampling device for determining the variations in a physical property of a product, the device comprising a measuring means having means for defining an area of said product measured instantaneously by said measuring means, means for transporting said product in a selected direction past said measuring means, said device having an initially established ratio between the size of said area and of the speed of said product, the steps comprising: adjusting one of the size of said area and the speed of said product, and adjusting the other of the size of said area and the speed of said product to maintain said initially established ratio substantially fixed.

14. A method of adjusting a statistical sampling device for determining variations in a physical property of a product the device comprising measuring means having means for defining an area of said product measured instantaneously by said measuring means, means for transporting said product in a selected direction past said measuring means, said device having an initially established ratio between the size of said area and the speed of said product, the steps comprising: adjusting one of the length of said area in said direction of movement of said product and the speed of said product, and adjusting the other of the length of said area and the speed of said product to maintain said initially established ratio substantially constant.

15. A method of adjusting a statistical sampling device for determining the variations in a physical property of a product, the device comprising measuring means including a radiation source for irradiating said product and means for detecting radiation from said product, means initially adjusted to define an area of said product measured instantaneously by said measuring means and means initially adjusted to establish a desired radiation intensity at said detecting means, comprising the steps of: adjusting the size of said area, and adjusting the radiation intensity reaching said detecting means to maintain the radiation reaching said detecting means with no product present substantially at said desired radiation intensity.

16. A method of adjusting a device for determining the variations in a physical property of a product, the device comprising measuring means including a radiation source for irradiating said product and means for detecting radiation from said product to initially produce a predetermined desired response, means initially adjusted to define a predetermined area of said product measured instantaneously by said measuring means, to thereby establish a desired relationship between the size of said area and the response of said detecting means, the steps comprising: adjusting one of the size of said area and said measuring means; and adjusting the other of the size of said area and said measuring means to restore said desired detecting means response.

References Cited

UNITED STATES PATENTS 2,954,775 10/1960 Radley et al. _____ 250—83.3 X
3,010,020 11/1961 Alcock _____ 250—83.3

RALPH G. NILSON, *Primary Examiner.*

SAUL ELBAUM, *Assistant Examiner.*

U.S. Cl. X.R.

250—52, 105